United States Patent [19]

Scarpa et al.

[11] Patent Number: 5,220,993
[45] Date of Patent: Jun. 22, 1993

[54] MULTIPLE LANE POUCH DROP-OFF

[75] Inventors: Eric W. Scarpa, Cincinnati; Harold T. Benner, Jr., Wyoming; Daniel J. Rack, Cincinnati, all of Ohio

[73] Assignee: R. A. Jones & Co. Inc., Covington, Ky.

[21] Appl. No.: 966,867

[22] Filed: Oct. 26, 1992

[51] Int. Cl.[5] ............................................. B65G 47/26
[52] U.S. Cl. ..................................... 198/431; 198/438
[58] Field of Search ............... 198/428, 431, 438, 370, 198/372, 364

[56] References Cited

U.S. PATENT DOCUMENTS

| | | |
|---|---|---|
| 3,822,008 | 7/1974 | Benner, Jr. et al. |
| 3,851,751 | 12/1974 | Jones . |
| 3,961,697 | 6/1976 | Hartman et al. |
| 4,391,372 | 7/1983 | Calhoun ............................... 198/370 |
| 4,569,444 | 2/1986 | McEvoy et al. .................... 198/364 |
| 4,585,113 | 4/1986 | Greenwell . |
| 4,718,535 | 1/1988 | Wolff ................................. 198/428 |
| 4,872,382 | 10/1989 | Benner, Jr. et al. |
| 5,168,977 | 12/1992 | Essen ................................. 198/364 |

Primary Examiner—Joseph E. Valenza
Attorney, Agent, or Firm—Wood, Herron & Evans

[57] ABSTRACT

Pouch transfer apparatus for positioning over and generally transverse to the upstream end of a multiple lane pouch conveyor. The apparatus includes a transfer wheel carrying a plurality of suction heads about its outer periphery for picking pouches off a cutting apparatus that has cut a pouch strip into individual pouches. The transfer wheel distributes the individual pouches at three predetermined angular drop-off positions during the rotation of the transfer wheel. The suction heads are divided into three series or flights, i.e., a first series for dropping pouches into a near lane of the pouch conveyor, a second series for dropping pouches into a middle lane of the pouch conveyor, and a third series for dropping pouches into a far lane of the pouch conveyor. Positive pressure is supplied to each suction head at its drop-off point to eject the pouch into the appropriate conveyor lane. Adjustment mechanisms are provided for independently adjusting the drop-off points for the pouches headed for each lane of the pouch conveyor. These adjustment mechanisms independently adjust the angular point during the rotation of the transfer wheel at which positive pressure is supplied to each series of suction heads.

20 Claims, 8 Drawing Sheets

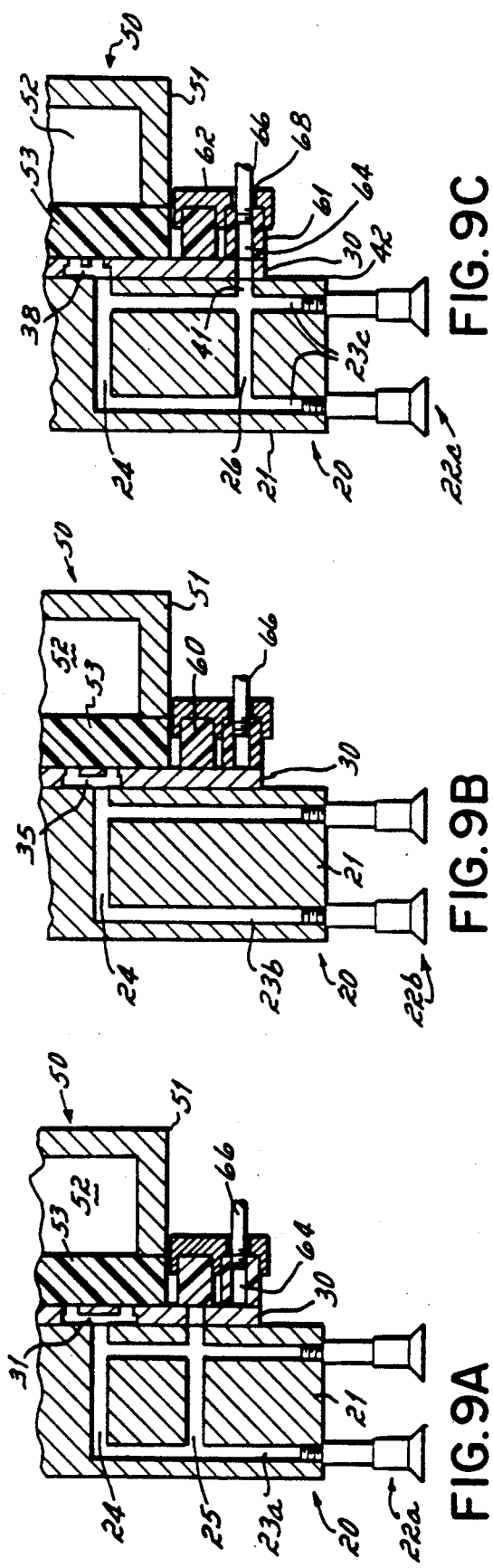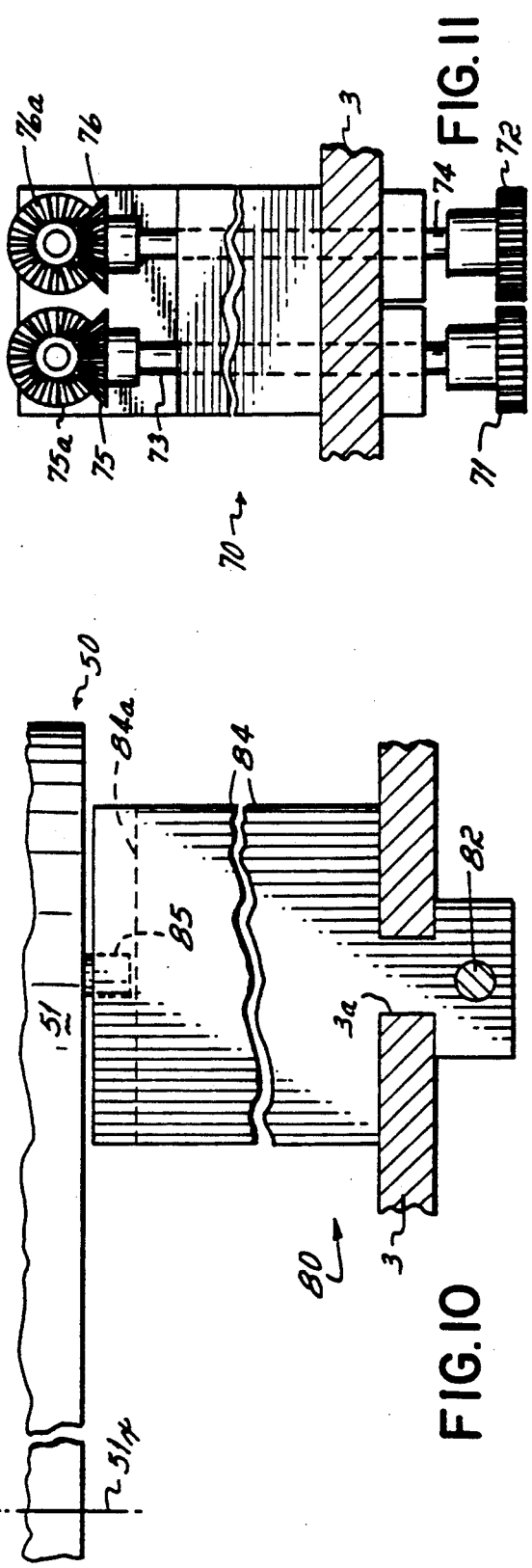

MULTIPLE LANE POUCH DROP-OFF

The present invention generally relates to pouch forming apparatus and more particularly to apparatus for accurately depositing individual pouches, formed, filled and sealed, into respective drop-off conveyor lanes. Specifically, the invention is an improvement over apparatus of the type disclosed and claimed in Hartman et al. U.S. Pat. No. 3,961,697 (Hartman '697) which is assigned to the assignee of the present invention. U.S. Pat. No. 3,961,697 is fully and expressly incorporated by reference herein.

In Hartman '697, pouches are formed, filled and sealed in a train of connected individual pouches with the pouches being connected to adjacent pouches on each side by a transverse seal. The train of pouches is wrapped around a cut-off apparatus which severs each pouch from its succeeding pouch, thereby converting the train of pouches into a plurality of individual pouches for packaging.

At the cut-off apparatus shown in Hartman '697, each of the several pouches are contacted by one of a group of suction heads angularly spaced and extending radially from the outer periphery of a transfer wheel. The heads form a circumference which at one location is operatively tangent to the cut-off apparatus. The severed pouches are picked up from the cut-off apparatus by suction heads on the transfer wheel and carried to a drop-off area.

It is common to carry the pouches to a drop-off area comprising two or three drop-off points. In Hartman '697 two adjacent but separate pouches on the transfer wheel are dropped at two separate drop-off points in the drop-off area so as to fill up two lanes of a pouch conveyor. The pouch conveyor runs under the transfer wheel at right angles or transversely to it. In other words, the pouch conveyor runs in a direction which is generally parallel to the axis of rotation of the transfer wheel. Thus, Hartman '697 discloses a transfer mechanism that drops a leading pouch into a far lane and a following pouch into a near lane. Accordingly, since the conveyor lanes are disposed side by side, it will be appreciated that it is necessary to drop the pouches at slightly different times to accurately drop them into the desired lanes. In order to accomplish this, the device of Hartman '697 is provided with apparatus controlling the delivery of vacuum pressure or negative pressure to the suction heads such that the vacuum started just before pouch pick-up and stopped just at the proper drop-off point. A positive pressure is provided to the suction heads at the drop-off point to propel each pouch into the proper conveyor lane.

Hartman discloses controlling this selective application of vacuum through apparatus which includes a rotating transfer wheel having suction heads on its outer periphery and having a wear plate attached on one side that rotates with the transfer wheel. The wear plate has a plurality of passageways aligned with passageways in the transfer wheel leading to the suction heads. A vacuum shoe or manifold plate is adjustably mounted so as to sealingly engage the side of the wear plate opposite the transfer wheel. The vacuum shoe or manifold is biased by springs against the wear plate with a surface of the manifold plate in sealing engagement with the outer surface of the wear plate. The contact surface of the manifold plate includes a recess or cavity which is in communication through a radial bore to a hose which is connected to a source of negative pressure or vacuum. The manifold plate also has a cavity or recess which is connected by a radial bore to a fitting connected to a hose that leads to a source of positive pressure.

The vacuum recess or cavity of the manifold plate of Hartman '697 is configured to communicate with each of the suction heads via the passageways that are provided in the transfer wheel for selected or given angular movements of each of the suction heads during rotation of the transfer wheel. In a similar manner, the positive pressure cavity or recess in the manifold plate is configured to communicate with the ports in the wear plate leading to each of the suction heads when it reaches given points of travel during the rotation of the transfer wheel. These points of travel correspond to the two drop-off points for each of the two lanes of the pouch conveyor. The drop-off points for the suction heads alternate between the drop-off point for lane 1 of the pouch conveyor and the drop-off point for lane 2 of the pouch conveyor. In other words, every other suction cup drops its pouches into lane 1 of the pouch conveyor and the remaining suction heads drop pouches into lane 2. Thus, as the apparatus rotates, the suction heads are selectively provided with vacuum or positive pressure by the intermittent communication of the respective passages or ports.

The device disclosed in Hartman '697 provides for an adjustable mounting to angularly adjust the position of the manifold plate. In this regard, a mounting plate is rigidly secured to an intermediate plate which in turn is secured by spring biasing bolts to the vacuum manifold plate. The mounting plate may be adjusted via the bolt and elongated slot to angularly adjust the manifold plate and thereby adjust the positioning of the recesses or cavities in the manifold plate to adjust the point at which pouches are propelled off the suction heads onto their proper conveyor lanes.

It will be appreciated that the adjustment mechanism shown in Hartman '697 changes the drop-off point of all pouches together and not the drop-off point of one pouch with respect to an adjacent pouch designated for a different conveying lane. Thus, while the first pouch drop-off point may be set to accurately drop off the first pouch, in the device of Hartman '697 this adjustment also changed the subsequent pouch drop-off points. This risked causing the subsequent pouches to miss their intended drop-off conveyor lanes. This problem becomes particularly acute where pouches carrying products of varying weights and densities might be run on the same apparatus, as where speeds are varied in packaging lines having similar pouches. Heavier pouches, for example, may require more widely separated drop-off times between adjacent pouches than lighter pouches.

Accordingly, it has been one objective of the invention to more accurately transfer pouches from a pouch form, fill and seal machine to a multiple lane pouch conveyor.

It has been another object to provide a mechanism for allowing independent adjustment of the drop-off points for the suction heads on a pouch transfer wheel to compensate for filled pouches having different weights and densities, or to compensate for variations in delivery speeds.

SUMMARY OF THE INVENTION

To these ends, a preferred embodiment of the present invention includes a transfer apparatus adapted to be positioned over and generally transverse to the upstream end of a pouch conveyor. The apparatus includes a transfer wheel carrying a plurality of suction heads about its circumference for picking pouches from the cut-off apparatus and for dropping them into two or more and preferably three spaced apart, drop-off positions. Accordingly, the suction heads are divided into three series or flights, each flight containing several heads, each head in a flight dedicated to the same drop-off position for all other heads in the flight. On the wheel, the heads are preferably intermixed, a first flight head following a second flight head and that followed by a third flight head, and so on.

Means are provided for supplying each respecting head in each flight with a blow-off pressure to eject pouches at the dedicated drop-off position for that head. Each of the flights serving the outer extreme drop-off lanes, one and three, for example, are independently supplied with blow-off pressure, the delivery of which is adjustable independently of the blow-off position for the other two flights. In this way, the disposition of all pouches can be accurately fine-tuned regardless of which pouch drop off position they are directed through. The adjustment of pouch drop off at one position need not affect the drop off trajectory of pouches from an adjacent position. More particularly, the transfer wheel is positioned adjacent to a pouch cutting apparatus used to separate a train of pouches into individual pouches. At a point of tangency between the cutting wheel and the transfer wheel, the individual pouches are transferred from suction heads on the cutting wheel to suction heads on the transfer wheel. The transfer wheel has a series of pairs of suction heads extending radially from its outer periphery, each pair adapted to hold one pouch. Each pair of suction heads is dedicated to dropping pouches onto a specific lane of the pouch conveyor. The transfer wheel of the preferred embodiment is designed to work in conjunction with a three lane pouch conveyor. One, two or even more suction heads may be used at each pouch holding location. Each pair of suction heads is dedicated to delivering a pouch to a specific lane (i.e., the near lane, the middle lane, or far lane) of the pouch conveyor and thus always drop their pouch onto that specific lane. As noted, in a wheel having many heads, there thus may be three suction head flights or series, for example, with the suction heads of one flight dedicated to drop pouches in the near lane, another flight for the middle lane, and the third set for the far lane.

The transfer wheel is rigidly secured to a drive shaft extending between vertical frame members. The drive shaft extends through one of the frame members for connection to a motor. The transfer wheel has a series of radial ports extending between the periphery and one side of the transfer wheel. Each port communicates with a fitting extending from the periphery of the transfer wheel for attachment to a suction head. The suction heads are arranged in pairs around the peripheral surface of the transfer wheel. Thus, each suction head communicates with a radial port which extends into the transfer wheel at approximately 90° to the axis of rotation.

For each pair of suction heads that drops pouches into the near lane of the pouch conveyor there is a first axial blow-off port extending generally parallel to the axis of rotation of the transfer wheel which communicates with the outside surface of the transfer wheel in line with an inner adjustable drop-off shoe to be described later. In a like manner, for each pair of suction heads that drops pouches into the far lane of the pouch conveyor there is a second axial blow-off port extending generally parallel to the axis of rotation which also communicates with the outside surface of the transfer wheel in line with an outer adjustable drop-off shoe to be described later. At a distance radially inward of the first and second axial blow-off ports communicating with the inner and outer adjustable drop-off shoes, each suction cup porting arrangement includes an inner axial port extending parallel to the axis of rotation and communicating with the side of the transfer wheel as the first and second axial blow-off ports at a radial position at which a vacuum shoe is mounted.

A wear plate is rigidly secured to the side of the transfer wheel with which the axial ports communicate and the wear plate rotates with the transfer wheel. The wear plate has radially extending ported slots facing the transfer wheel so as to intersect with the inner axial port of each suction head porting arrangement. Each ported slot has two axially extending ports to allow communication between the slot and the side of the wear plate opposite the transfer wheel. These axially extending ports intermittently line up with ports in the vacuum shoe during rotation of the transfer wheel to supply negative pressure or vacuum pressure to the inner axial port in each suction head porting system of the transfer wheel assembly.

The vacuum shoe is mounted to resiliently engage the outside surface of the wear plate, i.e., the side of the wear plate opposite the transfer wheel. The vacuum shoe has a vacuum reservoir rigidly secured thereto and the vacuum shoe has ports which communicate between a vacuum chamber in the vacuum reservoir and a surface of the vacuum shoe that is resiliently urged against the wear plate. The ports in the vacuum shoe intermittently communicate with the ports extending through the wear plate as the transfer wheel and wear plate rotate against the vacuum shoe. The porting arrangements in the vacuum shoe and wear plate cause vacuum pressure to be supplied through the vacuum shoe, wear plate, and transfer wheel to the suction heads during that part of the rotation of the transfer wheel in which it is desired to hold a pouch. The vacuum or negative pressure is either cut off or superseded by a positive blow-off pressure supplied to the respective suction heads when the near lane suction heads reach the near lane drop-off point, the middle lane suction heads reach the middle lane drop-off point and the far lane suction heads reach the far lane drop-off point during rotation of the transfer wheel. When the suction heads are not carrying pouches, no pressure differentials are supplied to the suction heads, except at an optional pressure passage cleanout location.

Inner and outer adjustable drop-off shoes are resiliently urged against the outside of the wear plate at a position radially outward of the vacuum shoe. The inner adjustable drop-off shoe controls the drop-off point of the pouches destined for the near lane of the pouch conveyor and the outer adjustable drop-off shoe controls the drop-off point of the pouches destined for the far lane of the pouch conveyor. Each adjustable drop-off shoe has an arcuate slot facing the outside surface of the wear plate for intermittent communication with the near lane and the far lane axial blow-off ports in the wear plate and the transfer wheel. A port extends from the outside surface of each adjustable drop-off shoe to the arcuate slot of the respective shoe.

The slot in the inner adjustable drop-off shoe intermittently communicates only with the near lane axial blow-off ports in the wear plate and transfer wheel leading to those pairs of suction heads dedicated to dropping pouches into the near lane of the pouch conveyor. The arcuate slot of the outer adjustable drop-off shoe communicates only with the far lane axial blow-off ports in the wear plate and transfer wheel leading to those pairs of suction heads that drop pouches into the far lane of the pouch conveyor.

The adjustable drop-off shoes may be independently adjusted to change the position at which the near lane and the far lane axial blow-off ports in the wear plate come into contact with the slot in the near lane or inner adjustable drop-off shoe and the far lane or outer adjustable drop-off shoe. In this way, the drop-off point of the suction heads dedicated to the near and far conveyor lanes may be independently adjusted to change the point at which positive pressure is applied to the near lane and far lane dedicated suction heads. This allows the operator to compensate for the particular size and weight characteristics of the pouches being run through the apparatus, or the rotational speed of the transfer wheel.

The vacuum shoe has an arcuate slot facing the wear plate at the drop-off point for the middle lane suction heads. A positive air pressure is supplied to this arcuate slot through a port extending through the side of the vacuum shoe opposite the wear plate. The vacuum shoe/vacuum reservoir assembly has an adjustment mechanism for adjusting the angular location of this blind arcuate slot to adjust the drop-off point for the pouches to be dropped in the middle lane of the pouch conveyor. During initial set-up of the machine, the drop-off point of the pouches to be dropped in the middle lane of the pouch conveyor is first adjusted via the adjustment mechanism connected to the vacuum shoe/vacuum reservoir assembly. Then the individual near lane and far lane adjustable drop-off shoes are adjusted to independently set the drop-off points for the pouches designated for the near and far lanes. Thus, the previously set drop-off point for the middle lane is used as a reference point from which the near lane and far lane adjustments are made.

The adjustment mechanism for the vacuum shoe/vacuum reservoir assembly, i.e. the middle lane drop-off point, includes a threaded rod which is operatively attached to the vacuum shoe/vacuum reservoir assembly via a pin and slot arrangement. The vacuum shoe/vacuum reservoir assembly is mounted so as to allow angular movement thereof by rotation of the threaded rod.

The adjustment mechanism for the near lane and far lane adjustable drop-off shoes includes a gear arrangement attached to a threaded rod which in turn is attached to a specific adjustable drop-off shoe. Two adjustment knobs are provided on the outside of the frame of the transfer wheel, each knob for adjusting a different drop-off shoe. The two knobs of the gear arrangement extend outside of the frame and each turn a gear which meshes with a second gear at a 45° angle. The second gear is operatively attached to a rod that is threadedly engaged with a respective adjustable drop-off shoe. Rotation of the threaded rods causes arcuate movement of the adjustable drop-off shoes thereby changing the angular position of the arcuate slots in the drop-off shoes.

The several objectives and features of the invention will become more readily apparent from the following detailed description taken in conjunction with the accompanying drawings in which.

Figure 1:
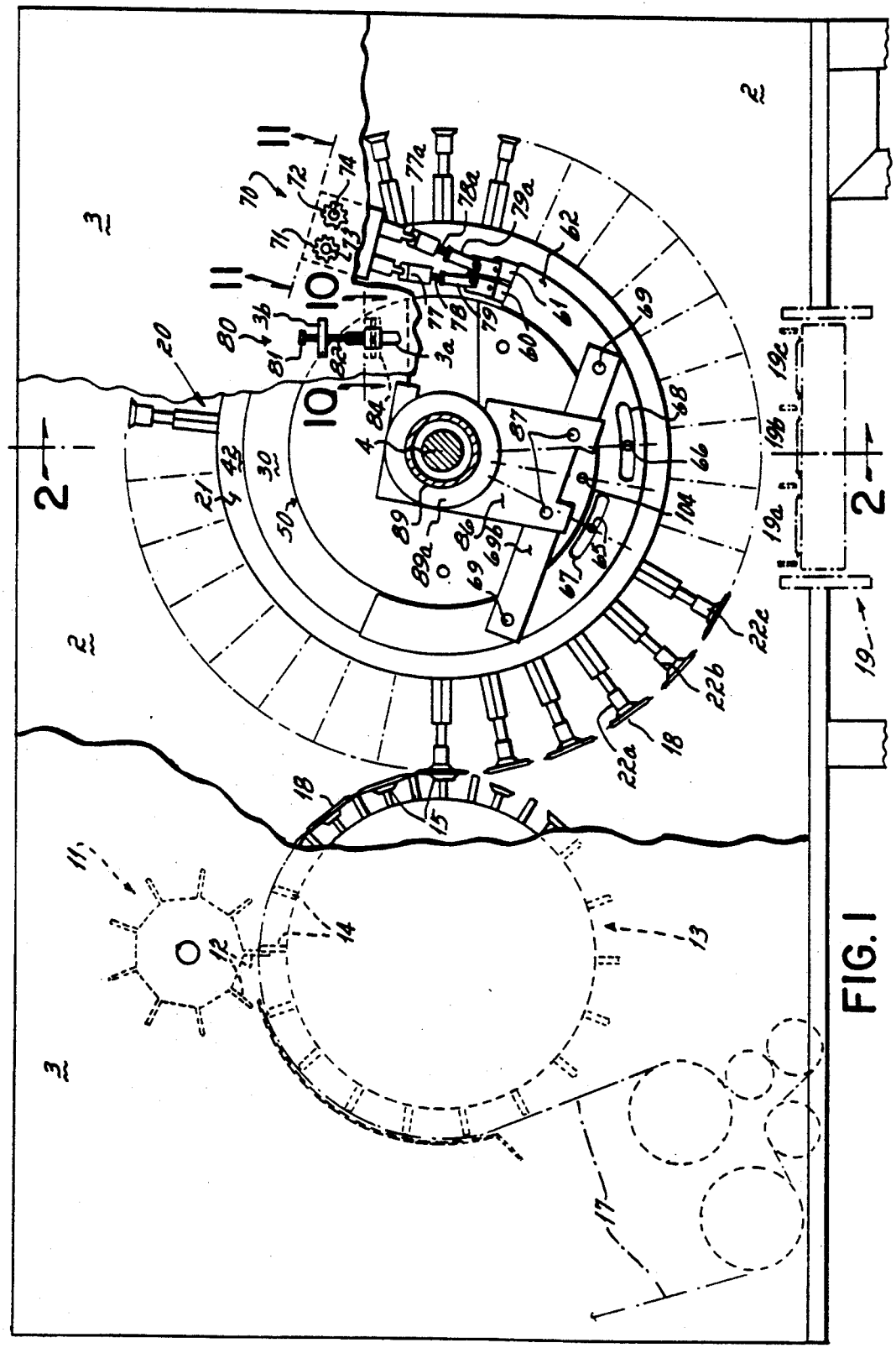
FIG. 1 is a diagrammatic plan view of a pouch transfer mechanism utilizing the improved transfer wheel of the present invention.
Figure 3:
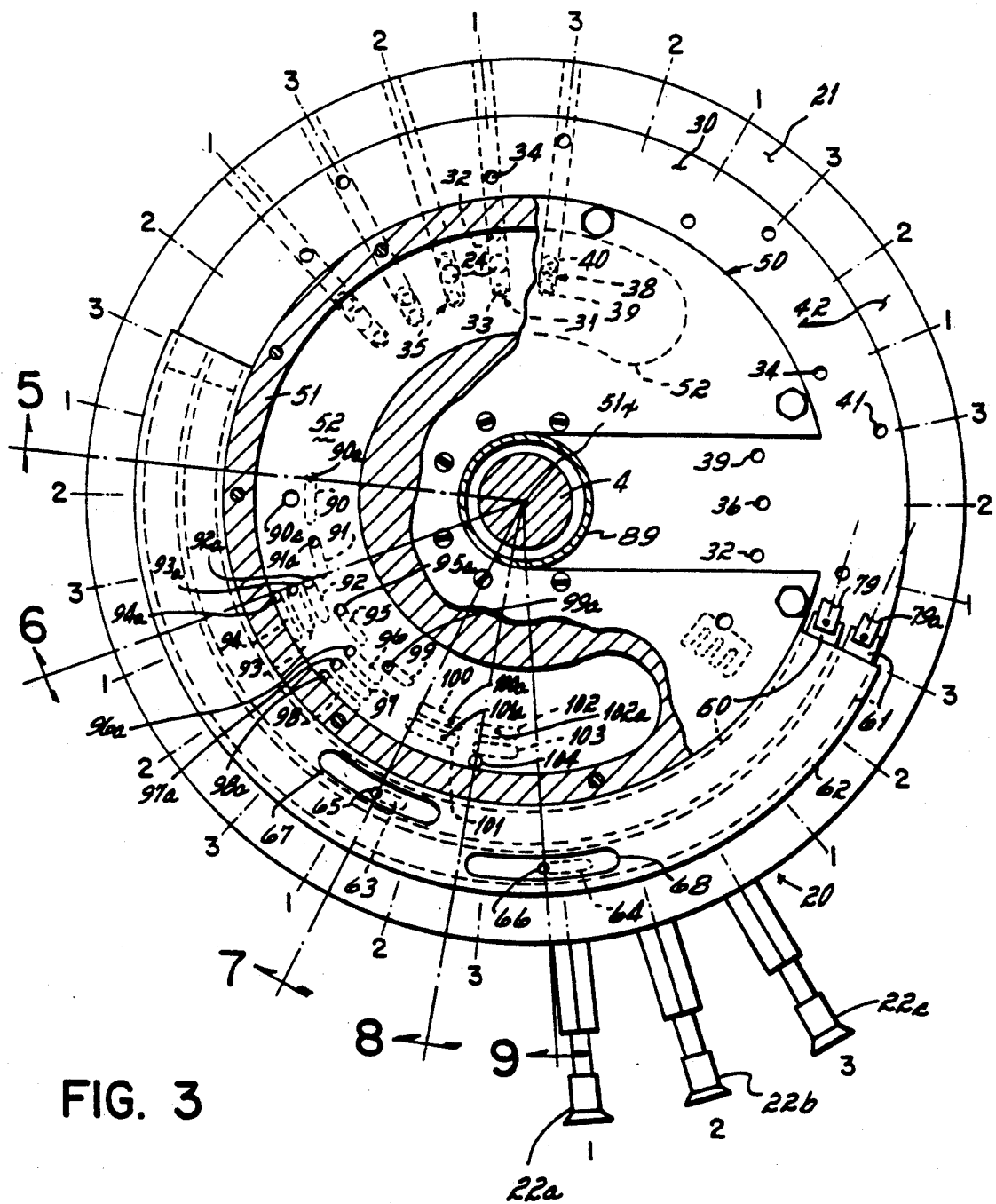
FIG. 3 is a cross-sectional view of the pouch transfer apparatus taken along line 3—3 of FIG. 2 with portions broken away to show the inner details of the transfer wheel mechanism.
Figure 5A:
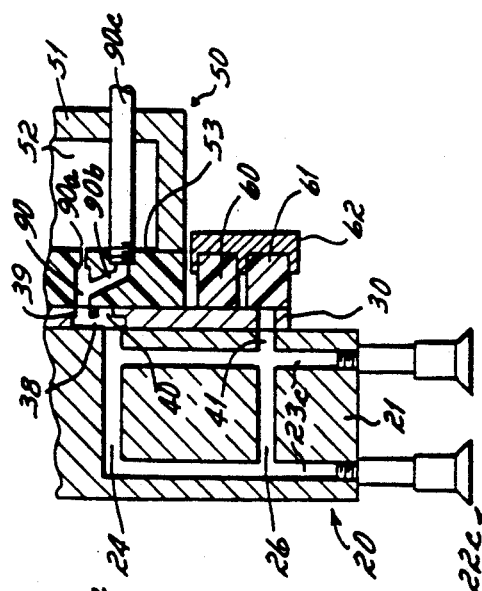
Figure 5B:
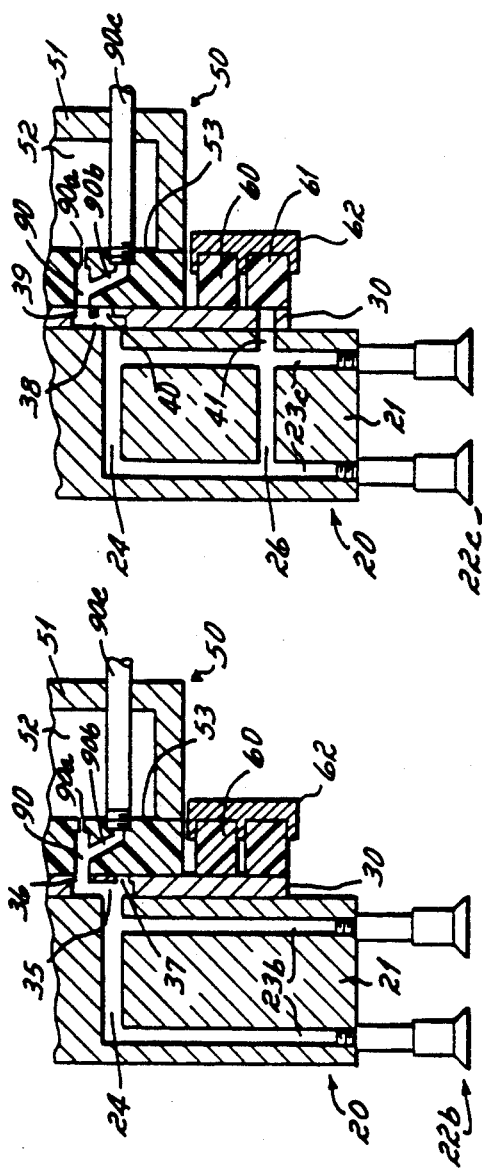
Figure 5C:
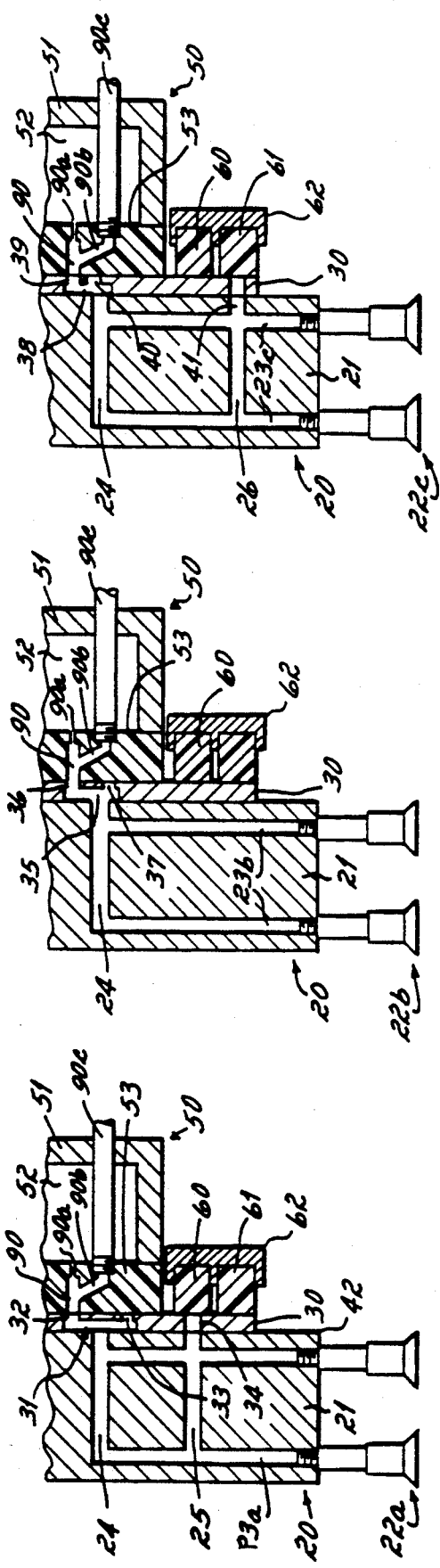
Figure 6A:
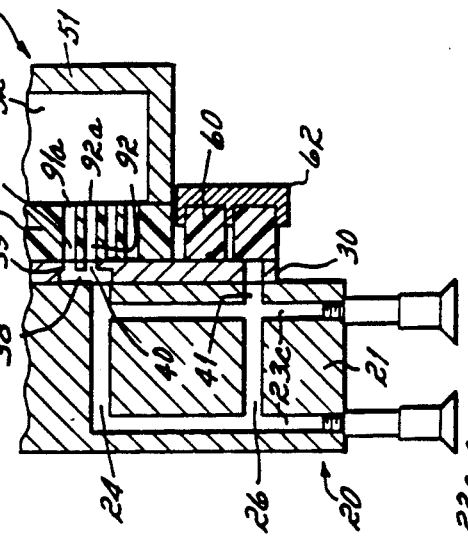
Figure 6B:
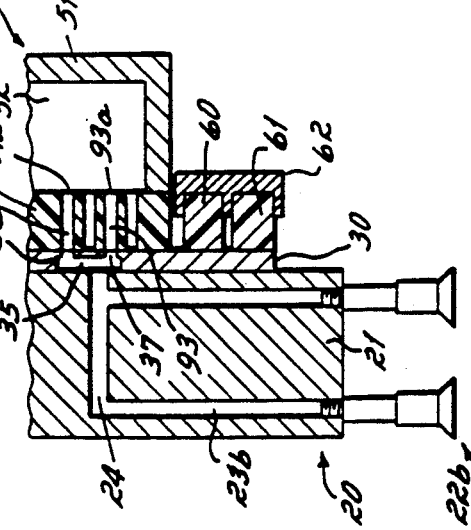
Figure 6C:
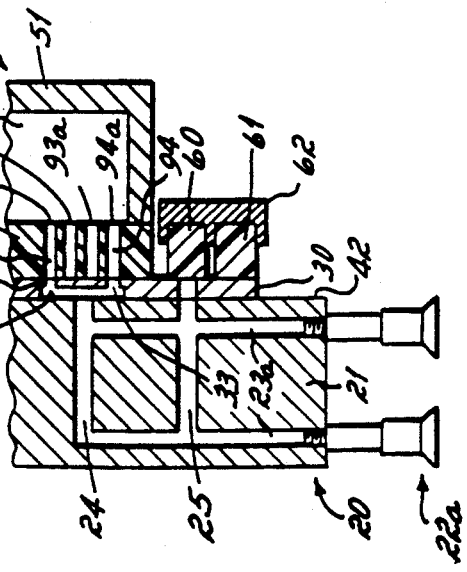
Figure 7A:
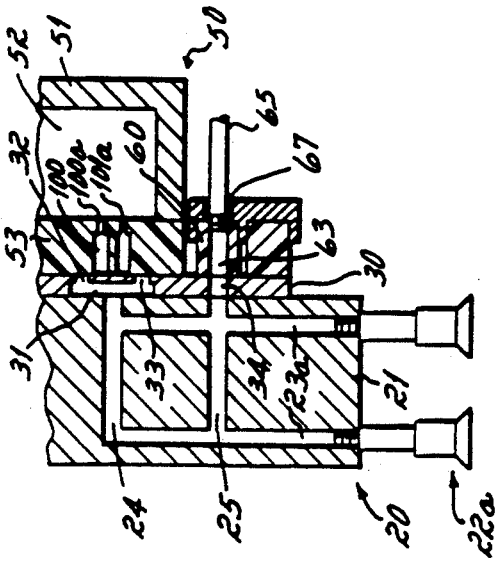
Figure 7B:
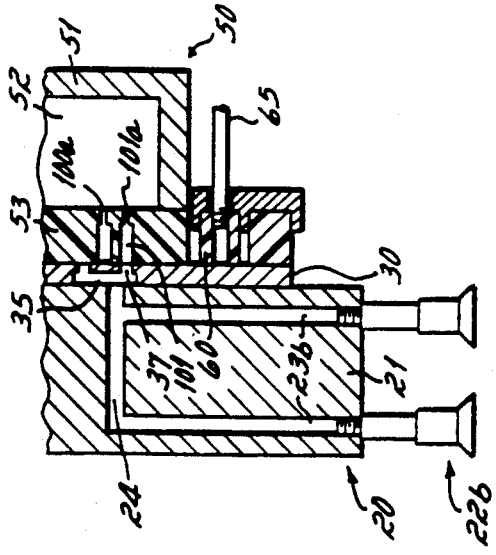
Figure 7C:
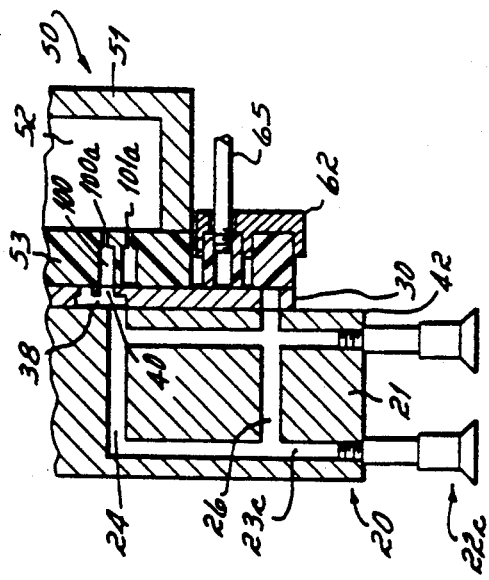
Figure 8A:
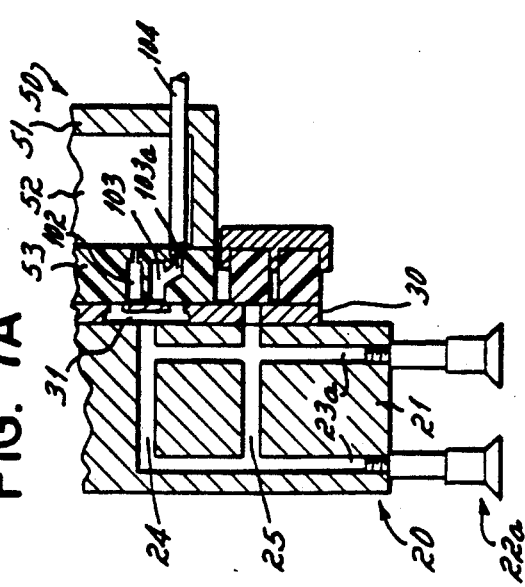
Figure 8B:
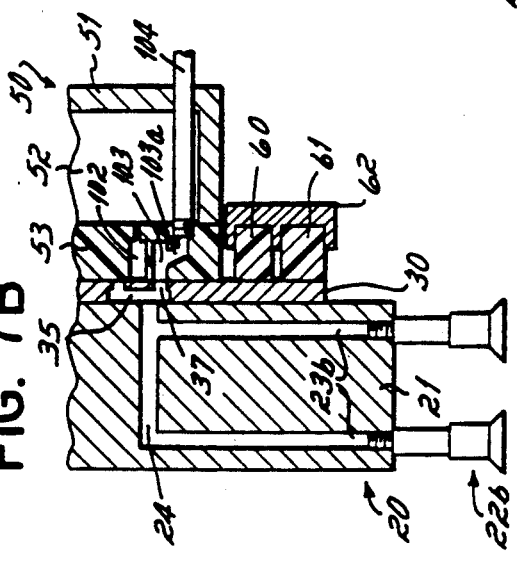
Figure 8C:
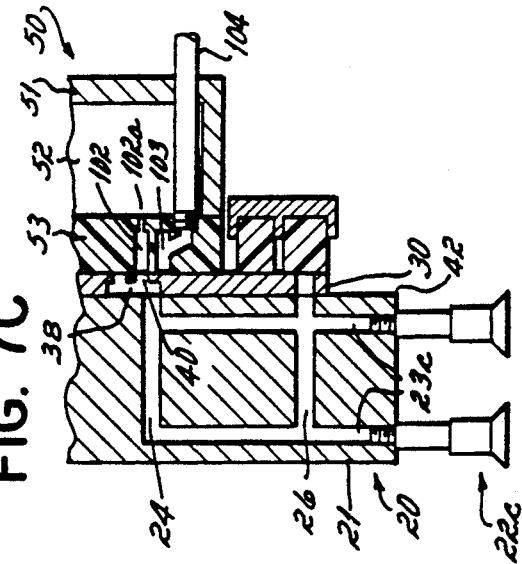

FIGS. 5A to 5C are partial cross-sectional views taken along line 5—5 of FIG. 3 and showing the transfer wheel, wear plate, near and far lane adjustable drop-off shoes, vacuum shoe and the respective porting arrangements for the pairs of suction heads dedicated to the near, middle and far lanes, respectively, and showing the application of vacuum pressure to each of the pairs of suction heads as they pass this position shown in FIG. 3;

FIGS. 6A to 6C are partial cross-sectional views taken along line 6—6 of FIG. 3 and showing the transfer wheel, wear plate, near and far lane adjustable drop-off shoes, vacuum shoe and the respective porting arrangements for the pairs of suction heads dedicated to the near, middle and far lanes, respectively, and showing the application of vacuum pressure to each of the pairs of suction heads as they pass this position shown in FIG. 3;

FIGS. 7A to 7C are partial cross-sectional views taken along line 7—7 of FIG. 3 and showing the transfer wheel, wear plate, near and far lane adjustable drop-off shoes, vacuum shoe and the respective porting arrangements for the pairs of suction heads dedicated to the near, middle and far lanes, respectively, and showing the application of positive pressure to the near lane suction heads and vacuum pressure to the middle and far lane suction heads as each of these pairs of suction heads pass this position shown in FIG. 3;

FIGS. 8A to 8C are partial cross-sectional views taken along line 8—8 of FIG. 3 and showing the transfer wheel, wear plate, near and far lane adjustable drop-off shoes, vacuum shoe and the respective porting arrangements for the pairs of suction heads dedicated to the near, middle and far lanes, respectively, and showing no application of pressure to the near lane suction heads, the application of positive pressure to the middle lane suction heads, and the application of vacuum pressure to the far lane suction heads as each of these pairs of suction heads pass this position shown in FIG. 3;

FIGS. 9A to 9C are partial cross-sectional views taken along line 9—9 of FIG. 3 and showing the transfer wheel, wear plate, near and far lane adjustable drop-off shoes, vacuum shoe and the respective porting arrangements for the pairs of suction heads dedicated to the near, middle and far lanes, respectively, and showing no application of pressure to the near lane and middle lane suction heads and the application of positive pressure to the far lane suction heads as each of these pairs of suction heads pass this position shown in FIG. 3;

FIG. 10 is a cross-sectional view of the adjustment mechanism for the vacuum shoe taken along line 10—10 of FIG. 1; and, FIG. 11 is a cross-sectional view of the adjustment mechanisms for the near lane and far lane adjustable drop-off shoes taken along line 11—11 of FIG. 1.

GENERAL ORGANIZATION

In FIG. 1 a pouch transfer apparatus 1 is shown and includes an index wheel 13 which takes the train of pouches or pouch strip 17 from the form, fill and seal machine and passes it by the cutting wheel 11 where the train of pouches 17 is cut into individual pouches 18. The index wheel 13 has a plurality of circumferentially spaced blades 14 which interact in scissor-like fashion with blades 12 circumferentially spaced about the periphery of the cutting wheel 11. After the train of pouches 17 has been cut into individual pouches 18. The individual pouches are held by suction heads 15 and are rotated approximately 90° where they meet the suction heads 22 of the transfer wheel assembly 20. The vacuum pressure supplied to the index wheel suction heads 15 is shut off at this transfer point and vacuum pressure is supplied to the suction heads 22a, 22b, 22c of transfer wheel assembly 20 so that the pouches 18 are transferred from the index wheel 13 to the transfer wheel assembly 20.

The design and configuration of the cutting wheel 11 and the index wheel 13 is essentially the same as the design of the index wheel and cutting wheel disclosed in Hartman et al. U.S. Pat. No. 3,961,697 and discussed above. In the present invention, however, certain necessary modifications have been made to the index wheel 35 disclosed by Hartman et al. such that the suction heads now release the pouches 18 at a single point, rather than at two different points as is the case in the Hartman '697 patent where pouches are being dropped onto two lanes of a pouch conveyor. For example, only one vacuum slot and one positive pressure slot will be necessary in the index wheel 13 of the present invention since there is only one release point for the pouches 18 travelling around the index wheel 13 of the present invention.

A vacuum slot such as the vacuum slot 85 in the index wheel 36 of the Hartman '697 patent may be provided in the index wheel 13 of the present invention from a point where the train of pouches 17 enters the index wheel 13 to the point where the index wheel 13 meets the transfer wheel assembly 20. At this transfer point, the vacuum slot will end, thus cutting off the vacuum pressure to the index wheel suction heads 15 and allowing the vacuum pressurized suction heads 22a, 22b, 22c of the transfer wheel 21 to grasp the pouches 18 off the index wheel 13 The transfer wheel assembly 20 then continues to rotate approximately 90° to a multiple lane pouch conveyor 19 where the pouches 18 are successively dropped from drop-off points defined in a drop-off segment of rotation of the transfer wheel into the near lane 19a, middle lane 19b and far lane 19c of the pouch conveyor 19. The pouch conveyor 19 then takes the pouches 18 downstream to a packaging apparatus (not shown) where, for example, they are loaded into cartons.

THE TRANSFER WHEEL ASSEMBLY

Figure 2:
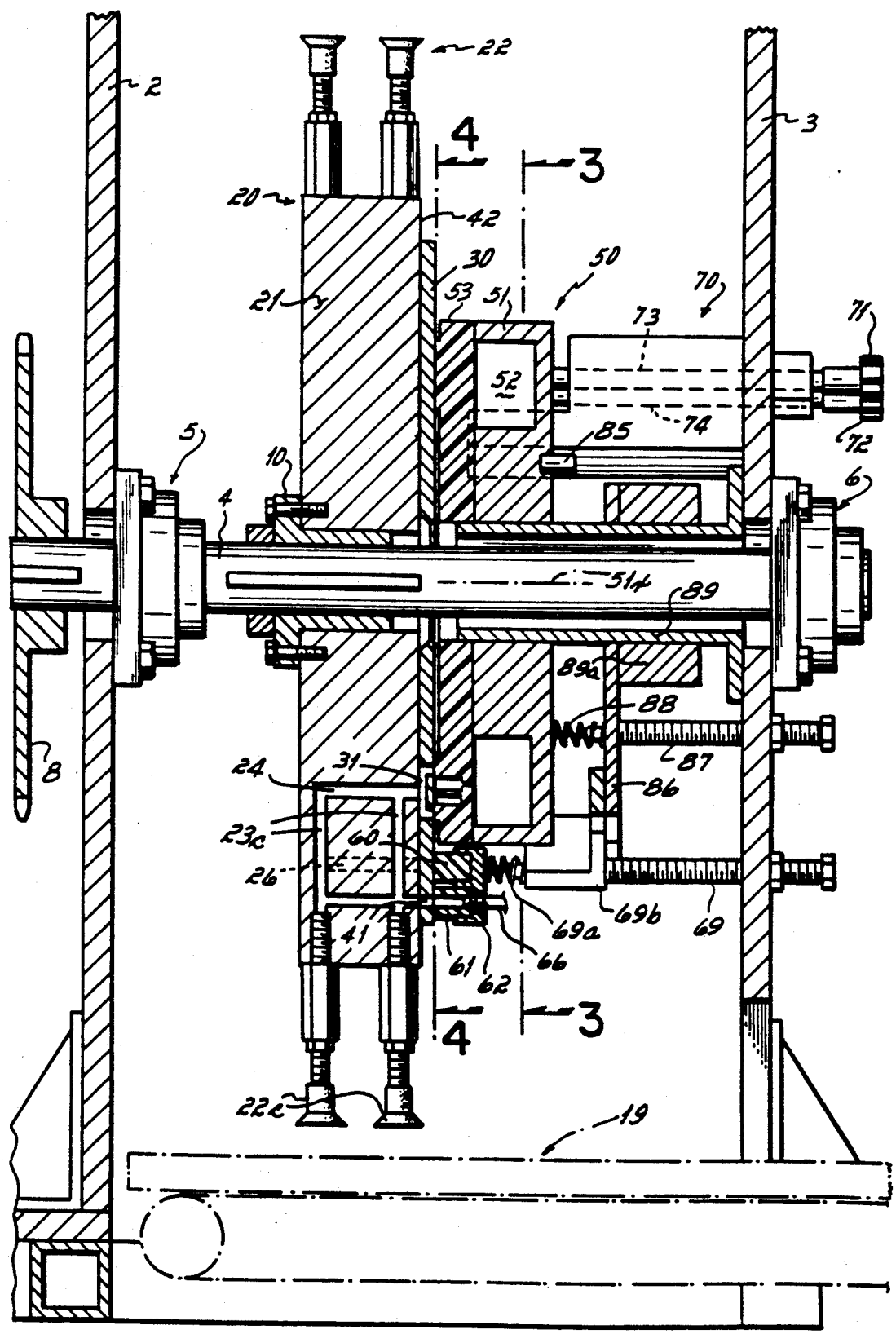
FIG. 2 is a cross-sectional view of the pouch transfer apparatus taken along line 2—2 of FIG. 1.

As shown in FIGS. 2 and 3, the transfer wheel assembly 20 includes a transfer wheel 21 having a plurality of circumferentially spaced pairs of suction heads such as 22a, 22b, 22c spaced about and radially extending from the periphery of the transfer wheel 21. The transfer wheel assembly 20 also includes a wear plate 30 rigidly secured to one side 42 of the transfer wheel 21. The transfer wheel assembly 20 is rigidly secured to a drive shaft 4 by a mounting plate 10. The transfer wheel 21 and wear plate 30 rotate together with the drive shaft 4 which is driven by a motor (not shown) which is drivingly connected to a sprocket 8. The drive shaft 4 is attached to a pair of frame members 2, 3 via bearing members 5 and 6.

As shown best in FIGS. 2 and 3, each pair of suction heads 22a, 22b, 22c has a corresponding pair of radial ports 23a, 23b, 23c extending inwardly from the pairs of suction heads 22a, 22b, 22c. As shown in FIG. 3, the pairs of suction heads are divided into repeating groups of three pairs of suction heads 22a, 22b, 22c with each pair of suction heads being dedicated to drop pouches into a specific lane of the pouch conveyor 19. Thus, there is a flight of suction heads 22a, a flight of suction heads 22b, and a flight of suction heads 22c. A suction head of each flight is thus located in each group of three heads.

Radial ports 23a extend inwardly from the suction heads 22a that drop pouches into the near lane 19a of the pouch conveyor 19. Radial ports 23b extend inwardly from the suction heads 22b that drop pouches into the middle lane 19b of the pouch conveyor 19. Radial ports 23c extend inwardly from the suction heads 22c that drop pouches into the far lane 19c of the pouch conveyor 19.

The radial ports 23a, 23b, 23c are used to supply both vacuum pressure and positive pressure to the suction heads 22a, 22b, 22c depending on the segment of rotation through which the transfer wheel assembly 20 is travelling. Each pair of radial ports 23a, 23b, 23c are intersected by an inner axial port 24 which leads to one side 42 of the transfer wheel 21 and communicates with ported radial slots (to be described) in the wear plate 30 which in turn communicates with a source of vacuum pressure during the segment of rotation of the transfer wheel 21 in which it is desired to hold a pouch on a pair of suction heads 22. This segment of rotation corresponds to the period of rotation between a point where a pouch 18 is picked up off of the index wheel 13 and the drop-off point for a particular lane of the pouch conveyor 19.

As previous stated, each pair of radial ports 23a, 23b, 23c supplies a positive pressure to their respective pairs of suction heads 22a, 22b, 22c to propel pouches off the suction heads 22a, 22b, 22c at the different drop-off points for the three lanes 19a, 19b, 19c of the pouch conveyor 19. Specifically, the pair of radial ports 23a will supply a positive pressure at the proper drop-off point for the near lane 19a of the pouch conveyor 19 during the rotation of the transfer wheel assembly 20. The pair of radial ports 23b will be supplied with a positive pressure at the proper drop-off point for the middle lane 19b of the pouch conveyor. Finally, the pair of radial ports 23c will be supplied with a positive pressure at the proper drop-off point for the far lane 19c of the pouch conveyor 19.

The positive pressure which causes pouches to be propelled onto the middle lane 19b of the pouch conveyor 19 is supplied through the inner axial port 24 which communicates with each pair of middle lane radial ports 23b. A source of positive pressure is in communication with the inner axial port 24 at the point during the rotation of transfer wheel 21 in which a pouch must be released from the pair of suction heads 22c in order to accurately hit the middle lane 19b of the pouch conveyor 19.

Positive pressure is supplied to the near lane suction heads 22a and far lane suction heads 22c by axial blow-off ports, 25 and 26 respectively, which extend to the same side 42 of the transfer wheel 21 as the inner axial port 24. However, the axial blow-off ports 25, 26 are spaced radially outward of the inner axial port 24. The near lane axial blow-off port 25 communicates with a port 34 in the wear plate 30, which in turn communicates with a source of positive pressure at a point during the rotation of the transfer wheel assembly 20 in which a pouch must be dropped from the pair of suction heads 22a in order to accurately hit the near lane 19a of the pouch conveyor 19. The far lane axial blow-off port 26 communicates with a port 41 in the wear plate 30 which in turn communicates with a source of positive pressure at a point during the rotation of the transfer wheel assembly 20 in which a pouch must be dropped from the pair of suction heads 22c in order to accurately hit the far lane 19c of the pouch conveyor 19.

THE WEAR PLATE

FIGS. 5A-5C show the design of the ported radial slots 31, 35, 38, respectively, for each of the pairs of suction heads 22a, 22b, 22c. Only the length of these radial ported slots will change with each pair of suction heads 22a, 22b, 22c. The basic design remains the same for each pair of suction heads.

FIG. 5A shows the slot design for the near lane suction heads 22a. As previously mentioned, the wear plate 30 is rigidly secured to one side 42 of the transfer wheel 21. The wear plate 30 includes a radial slot 31 in communication with the inner axial port 24 which extends between the side 42 of the transfer wheel 21 and the pair of near lane radial ports 23a leading to the near lane suction heads 22a. The radial slot 31 has two axial ports 32, 33 extending through the wear plate 30 between the radial slot 31 and the side of the wear plate 30 opposite to the transfer wheel 21. As will be explained further below, these axial ports 32, 33 intermittently communicate with vacuum pressure supply means and positive pressure supply means depending on whether a pouch 18 is to be held or released during specific segments of rotation of the transfer wheel assembly 20.

FIG. 5B shows the porting arrangement in the wear plate for the middle lane suction heads 22b. Here, a radial slot 35 of a length that is shorter than the radial slot 31 faces the inner axial port 24 and communicates with the other side of the wear plate 30 through two axial ports 36, 37. These ports 36, 37 communicate with both vacuum pressure supply means and positive pressure supply means during rotation of the transfer wheel assembly 20 according to whether a pouch 18 is to be held or released during a given segment of rotation of the transfer wheel assembly 20.

FIG. 5C shows the porting arrangement for the suction heads 22c dedicated to drop pouches 18 into the far lane 19c of the pouch conveyor 19. Here, a radial slot 38 is shown facing the transfer wheel side 42 in communication with the inner axial port 24. As is the case with the near and middle lane wear plate porting arrangements, this blind radial slot 38 communicates with the opposite side of the wear plate 30 through two axial ports 39, 40. These axial ports 39, 40 are in intermittent communication with both vacuum pressure and positive pressure depending on whether a pouch 18 is to be held or released during a given segment of rotation of the transfer wheel assembly 20.

THE ADJUSTABLE VACUUM SHOE/VACUUM RESERVOIR ASSEMBLY

Turning back to FIG. 2, a vacuum shoe/vacuum reservoir assembly 50 is shown to be mounted against the side of the wear plate 30 opposite to the transfer wheel 21. The vacuum shoe/vacuum reservoir assembly 50 is resiliently urged against the outside surface of the wear plate 30 by a spring-loaded mounting assembly which includes a mounting plate 86, a pair of threaded rods 87 and a pair of springs 88. The mounting assembly is slidably attached to a stationary, cylindrical support 89 by a sliding bearing means 89a. The vacuum shoe/vacuum reservoir assembly 50 includes a vacuum reservoir 51 having an inner vacuum chamber 52 connected to a source of vacuum pressure (not shown). The vacuum reservoir 51 is rigidly secured to a vacuum shoe 53 such that the vacuum chamber 52 is in communication with one side of the vacuum shoe 53. The opposite side of the vacuum shoe 53 is resiliently urged against the side of the wear plate 30 opposite to the transfer wheel 21. As the transfer wheel assembly 20 rotates, the wear plate 30 rotates against the stationary vacuum shoe 53.

As shown in FIG. 3, the vacuum shoe 53 has a series of ported arcuate vacuum slots 90–102 and a positive pressure slot 103 facing the wear plate 30, located at an angular position that is between the pick-up point and the drop-off point for the pouches 18 being transferred from the index wheel 13 to the lanes 19a, 19b, 19c of the pouch conveyor 19. The series of ported arcuate vacuum slots 90–102 intermittently communicate with the axial ports 32, 33, 36, 37, 39, 40 in the wear plate 30 as the wear plate 30 rotates between the index wheel 13 and the multiple lane pouch conveyor 19. Thus, it is these arcuate vacuum slots in the vacuum shoe 53 that allow transfer of vacuum pressure from the vacuum chamber 52 to the suction heads 22a, 22b, 22c during the segment of rotation between the index wheel 13 and the different drop-off points for the lanes 19a, 19b, 19c of the pouch conveyor 19. This vacuum pressure allows pouches 18 to be grasped off of the index wheel 13 and carried to the pouch conveyor 19 where they are released into the appropriate lane by the application of positive pressure to be described in detail below.

As shown in FIG. 3 and detailed in FIG. 5A, during counter-clockwise rotation of the transfer wheel assembly 20, the axial port 32 in the wear plate 30 first comes into contact with the arcuate slot 90 in the vacuum shoe 53 at a position that is before the transfer point where a pouch 18 will be grasped off the index wheel 13. At this point during the rotation of the transfer wheel assembly 20, the arcuate slot 90 is lined up with the axial port 32 and vacuum pressure will be supplied from the vacuum chamber 52 through a reduced diameter port 90a leading to the slot 90. As previously explained, the port 32 in wear plate 30 communicates with the radial slot 31 which in turn communicates with the inner axial port 24 and radial ports 23a leading to the suction heads 22a.

FIGS. 5B and 5C show the similar porting arrangements that will supply vacuum pressure to suction heads 22b and 22c at a point during the rotation of the transfer wheel assembly that is just before pick-up of pouch 18 from the index wheel 13. It will be appreciated that ports 32, 36, and 39 are all at the same radial position so as to communicate with the arcuate slot 90 in the stationary vacuum shoe 53 at the same radial point during rotation of the transfer wheel assembly 20. Thus, each of the suction heads 22a, 22b, 22c grasps pouches off the index wheel 13 at the same point during rotation of the transfer wheel assembly 20.

As further shown in FIGS. 5A-5C, the arcuate slot 90 is also connected to a source 90c of positive pressure via a port 90b. This source 90c of positive pressure is not constant but is only activated if a pouch needs to be rejected for some reason. For example, if an upstream sensor means (not shown) has sensed that a pouch 18 has been improperly filled or not filled at all, the pouch may be automatically rejected at this point to prevent it from being packaged at the downstream end of the pouch conveyor 19. The port 90a is smaller in diameter than any of the ports leading from the positive pressure supply port 90b to the suction heads so that if positive pressure is activated to reject a pouch 18, the pressure will follow the path of least resistance, i.e., the larger diameter ports, to the suction heads 22a, 22b, 22c. This maintains the integrity of the vacuum level in the vacuum reservoir 51.

FIGS. 6A-6C show each of the suction heads 22a, 22b, 22c at a position just past the point where a pouch 18 has been grasped off the index wheel 13 and at which vacuum pressure is supplied to each suction head 22a, 22b, 22c to hold the pouch to the suction head. FIG. 6A shows the near lane suction heads 22a in communication with the vacuum chamber 52 through axial ports 32, 33 in the wear plate which have lined up with arcuate slots 91, 94 in the vacuum shoe 53. FIG. 6B shows that the middle lane suction heads 22b have been supplied with vacuum pressure through axial ports 36, 37 in the wear plate 30 which have lined up with arcuate slots 91, 93 in the vacuum shoe 53 at this point during the rotation of the transfer wheel assembly 20. FIG. 6C shows that the far lane suction heads 22c have been supplied with vacuum pressure through the axial ports 39, 40 in the wear plate 30 which have lined up with arcuate slots 91, 92 in the vacuum shoe 53 at this point during the rotation of the transfer wheel assembly 20.

FIGS. 7A-7C show the porting arrangements in the transfer wheel assembly 21 and the vacuum shoe 53 at the drop-off point for the pouches to be dropped from the near lane suction heads 22a to the near lane 19a of the pouch conveyor 19. FIG. 7A shows that all vacuum pressure has been cut off from the suction heads 22a since the ports 32, 33 are not in communication with the arcuate slots 100, 101 in the vacuum shoe 53. At the same time that vacuum pressure is cut off from suction heads 22a, a positive pressure is supplied from a positive pressure supply means 65 through a port 34 in the wear plate 30 and through the near lane axial blow off port 25 and radial ports 23a. This positive pressure supply means takes the form of an adjustable drop-off shoe 60 having an arcuate blow-off slot 63 which communicates with the port 34 as described in detail below. It is, of course, possible that due to adjustments made in the angular positions of the vacuum shoe and/or the inner drop-off shoe assembly, vacuum pressure may not be cut off at the exact moment that a pouch is to be released. To compensate for this occurrence, the ports leading to the arcuate vacuum slots in the vacuum shoe 53 may be of a smaller diameter than the ports leading from the positive pressure supply means to the suction heads.

FIG. 7B shows that the middle lane suction heads 22b are still supplied with vacuum pressure at this point during rotation of the transfer wheel assembly 20 since axial port 37 is in communication with an outer radial slot 101 in the vacuum shoe 53. This arcuate slot 101 is in communication with the vacuum chamber 52 through a reduced diameter port 101a.

FIG. 7C shows that the far lane suction heads 22c are still supplied with vacuum pressure at this point during the rotation of the transfer wheel assembly 20 since the axial port 40 is in communication with the inner arcuate slot 100 in the vacuum shoe 53. The arcuate slot 100 communicates with the vacuum chamber 51 through a reduced diameter port 100a.

FIGS. 8A-8C show the suction heads 22a, 22b, 22c at the angular position during rotation of the transfer wheel assembly 20 in which pouches are dropped from suction heads 22b onto the middle lane 19b of the pouch conveyor 19. Here, it is seen that there is no pressure, positive or negative, supplied to suction head 22a since the pouch has already been dropped from suction head 22a onto the near lane 19a of the pouch conveyor 19.

FIG. 8B shows the supply of positive pressure to suction heads 22b at the same point during rotation of the transfer wheel assembly 20 in order to drop a pouch 18 from a middle lane suction head 22b onto the middle lane 19b of the pouch conveyor 19. This positive pressure is supplied through a positive pressure supply line 104 connected to ports 103a and slot 103 in the vacuum shoe 53. The slot 103 in the vacuum shoe 53 is aligned with the axial port 37 in the wear plate 30 to allow pressurization of the radial ports 23b leading to the middle lane suction heads 22b.

FIG. 8C shows the continued application of vacuum pressure to the far lane suction heads 22c. This vacuum pressure is supplied through a reduced diameter port 102a leading to an arcuate slot 102 in the vacuum shoe 53. At this point during the rotation of the transfer wheel assembly 20, the arcuate slot 102 is aligned with the axial port 40 in the wear plate 30 so as to provide vacuum pressure to the radial slot 38 and, in turn, to the inner axial port 24 and radial ports 23c of the transfer wheel 21.

FIGS. 9A-9C show the suction heads 22a, 22b, 22c at the angular drop-off point for the pouches 18 being dropped from the suction heads 22c onto the far lane 19c of the pouch conveyor 19. FIGS. 9A and 9B show no application of pressure, positive or negative, to the suction heads 22a, 22b since these suction heads carry no pouches at this point during the rotation of the transfer wheel assembly 20.

FIG. 9C shows the application of positive pressure to the suction heads 22c so as to accurately propel a pouch 18 onto the far lane 19c of the pouch conveyor 19. At this point during the rotation of the transfer wheel assembly 20, the ports 39, 40 are no longer in communication with the vacuum chamber 52 and thus vacuum pressure has been cut off from the inner axial port 24 and, thus, from the suction heads 22c. As previously explained, if adjustments of the vacuum shoe and/or the outer drop-off shoe assembly cause vacuum pressure to still be applied at this point, the reduced diameter port 102a will prevent the positive pressure from travelling away from the suction heads 22c. It will be appreciated that the small ports 100a, 101a and 102a and their function may be omitted in specific applications of the invention when the geometry of the vacuum pressure and positive pressure passageways renders their function unnecessary. However, use of the small ports 100a, 101a, and 102a may help to insure repeatable desirable performance even where the slots are incorrectly manipulated or modified in the field.

At the far lane drop-off point, the far lane axial blow-off port 41 becomes aligned with an outer drop-off shoe 61 which is pressurized with a source 66 of positive pressure. This positive pressure travels through the far lane axial blow-off port 41 in the wear plate 30 and the far lane axial blow-off port 26 in the transfer wheel 21 to the suction heads 22c in order to propel a pouch 18 onto the far lane 19c of the pouch conveyor 19.

The adjustment mechanism 80 for angularly adjusting the vacuum shoe/vacuum reservoir assembly 50 is shown in FIGS. 1 and 10. The adjustment mechanism 80 includes an adjustment knob 81 attached to the end of a threaded rod 82 threadedly received by a support block 3b rigidly secured to the frame member 3. At the end of the threaded rod 82 that is opposite to the adjustment knob 81 the rod 82 is rotatably mounted to the end of a plate 84 that extends between the frame member 3 and the vacuum reservoir 51. The plate 84 is slidably received in an elongated slot 3a in the frame member 3 at one end and has an elongated slot 84a at the other end which slidably receives a pin 85 extending from the vacuum reservoir 51. Thus, as the adjustment knob 81 is rotated, the threaded rod 82 will move the plate 84 along the elongated slot 3a and, at the same time, will move the vacuum shoe/vacuum reservoir assembly 50 angularly about its axis of rotation 51x. The slot 84a and pin 85 allow the vacuum shoe/vacuum reservoir assembly 50 to pivot as it is angularly adjusted. It will be appreciated that angular adjustment of the vacuum shoe/vacuum reservoir assembly 50 will change the drop-off position for the pouches 18 to be dropped in the middle lane 19b of the pouch conveyor 19. That is, this angular adjustment of the vacuum shoe/vacuum reservoir assembly 50 changes the angular position of the middle lane blow-off slot 103 in the vacuum shoe 53 and therefore changes the angular position at which the middle lane axial port 37 communicates with the middle lane blow-off slot 103.

THE ADJUSTABLE DROP-OFF SHOE ASSEMBLY

As illustrated in FIG. 3, the adjustable drop-off shoe assembly includes an inner arcuate drop-off shoe 60 and an outer arcuate drop-off shoe 61 slidably housed in a cover 62. The inner arcuate drop-off shoe 60 has an arcuate slot 63 which is connected to source 65 of positive pressure and is positioned at the angular drop-off point for the pouches to be dropped from suction heads 22a onto the near lane 19a of the pouch conveyor 19. The cover 62 has an arcuate slot 67 in its top surface to allow for angular adjustment of the blind arcuate slot 63 and the source 65 of positive pressure to change the drop-off point for the pouches going to the near lane 19a of the pouch conveyor 19.

The outer arcuate drop-off shoe 61 includes an arcuate slot 64 connected to a source 66 of positive pressure. The arcuate slot 64 is positioned at the angular drop-off point for the pouches to be dropped from suction heads 22c onto the far lane 19c of the pouch conveyor 19. The cover 62 also has a slot 68 in its top surface through which the source 66 of positive pressure extends thus allowing angular adjustment of the arcuate slot 64 to change the drop-off position for the pouches being dropped from suction heads 22c onto the far lane 19c of the pouch conveyor 19.

The drop-off shoe assembly is mounted to the frame member 3 so as to be resiliently urged against the outside surface of the wear plate 30. The mounting assembly includes a pair of threaded rods 69 threadedly mounted to the frame member 3, and connected to a mounting plate 69b which in turn is connected to a spring 69a bearing against the cover 62 of the drop-off shoe assembly.

As shown in FIGS. 1 and 11, the adjustment mechanism 70 for the drop-off shoe assembly includes a pair of adjustment knobs 71, 72, respectively, for adjusting the angular position of the drop-off point for the pouches to be dropped onto the near lane 9a and far lane 19c of the pouch conveyor 19. As illustrated in FIG. 11, the near lane adjustment knob 71 is connected to a rod 73 which in turn is connected to a 45° gear 75 that meshes with another 45° gear 75a. Likewise, the far lane adjustment knob 72 is connected to a rod 74 leading to an identical gear arrangement 76, 76a. The gears 75a, 76a are operatively attached to male threaded rods 78, 78a through a pair of respective universal joints 77, 77a. The male threaded rods 78, 78a are threadedly received by female threaded members 79, 79a which are pivotally attached to the respective drop-off shoes 60, 61. It will thus be appreciated that rotation of the near lane adjustment knob 71 rotates the male threaded rod 78 into or out of the female threaded component 79, thus moving the inner drop-off shoe 60 slidably contained in the cover 62 to change the angular position of the inner lane blow-off slot 63. In the same manner, rotation of the far lane adjustment knob 71a will rotate the threaded rod 78a and thus move the outer drop-off shoe 61 slidably contained in the cover 62 to change the angular position of the far lane blow-off slot 64.

OPERATION

During the initial set up of the pouch transfer apparatus 1, the operator will first adjust the angular position of the vacuum shoe/vacuum reservoir assembly 50 using the adjustment mechanism 80 to precisely position the angular drop-off point for the pouches 18 to be dropped in the middle lane 19b of the pouch conveyor 19. Once the vacuum shoe/vacuum reservoir assembly 50 has been accurately adjusted to cause pouches to be released from the suction heads 22b onto the middle lane 19b of the pouch conveyor 19, that drop-off position is used as a reference point by which the inner drop-off shoe 60 and outer drop-off shoe 61 are adjusted to cause pouches 18 to be accurately released from the inner lane suction heads 22a and outer lane suction heads 22c onto the inner lane 19a and outer lane 19c of the pouch conveyor 19. Adjustments may also be made in the angular position of the vacuum shoe assembly 50 and the adjustable drop-off shoes 60, 61 during the operation of the pouch transfer apparatus 1 in order to fine-tune the angular drop-off positions for the pouches 18 on the suction heads 22a, 22b, 22c.

As illustrated in FIG. 1, the transfer wheel assembly 20 will rotate in a counter-clockwise direction and its suction heads 22a, 22b, 22c will grasp pouches 18 off the index wheel 13 at a point of tangency between the index wheel 13 and the transfer wheel assembly 20. At this point of tangency, vacuum pressure is supplied to the suction heads 22a, 22b, 22c spaced around the periphery of the transfer wheel 21 and vacuum pressure is cut off from the suction heads 15, spaced around the index wheel 13. The pouches 18 are then rotated with the transfer wheel 21 until the pouches carried by the suction heads 22a reach the drop-off point for the inner lane 19a of the pouch conveyor 19, the pouches 18 carried by the suction heads 22b reach the drop-off point for the middle lane 19b of the pouch conveyor 19 and the pouches 18 carried by the suction heads 22c reach the drop-off point for the far lane 19c of the pouch conveyor 19.

As previously explained in detail, the porting patterns in the vacuum shoe 53, wear plate 30, adjustable drop-off shoes 60, 61, and the transfer wheel 21 cause vacuum pressure to be supplied to each suction head 22a, 22b, 22c during the segment of rotation of the transfer wheel assembly 20 in which a pouch must be held by the suction heads and cause positive pressure to be supplied to each suction head 22a, 22b, 22c at their respective drop-off points as initially set by the drop-off shoe adjustment mechanism 70 and the vacuum shoe adjustment mechanism 80.

Figure 3A:
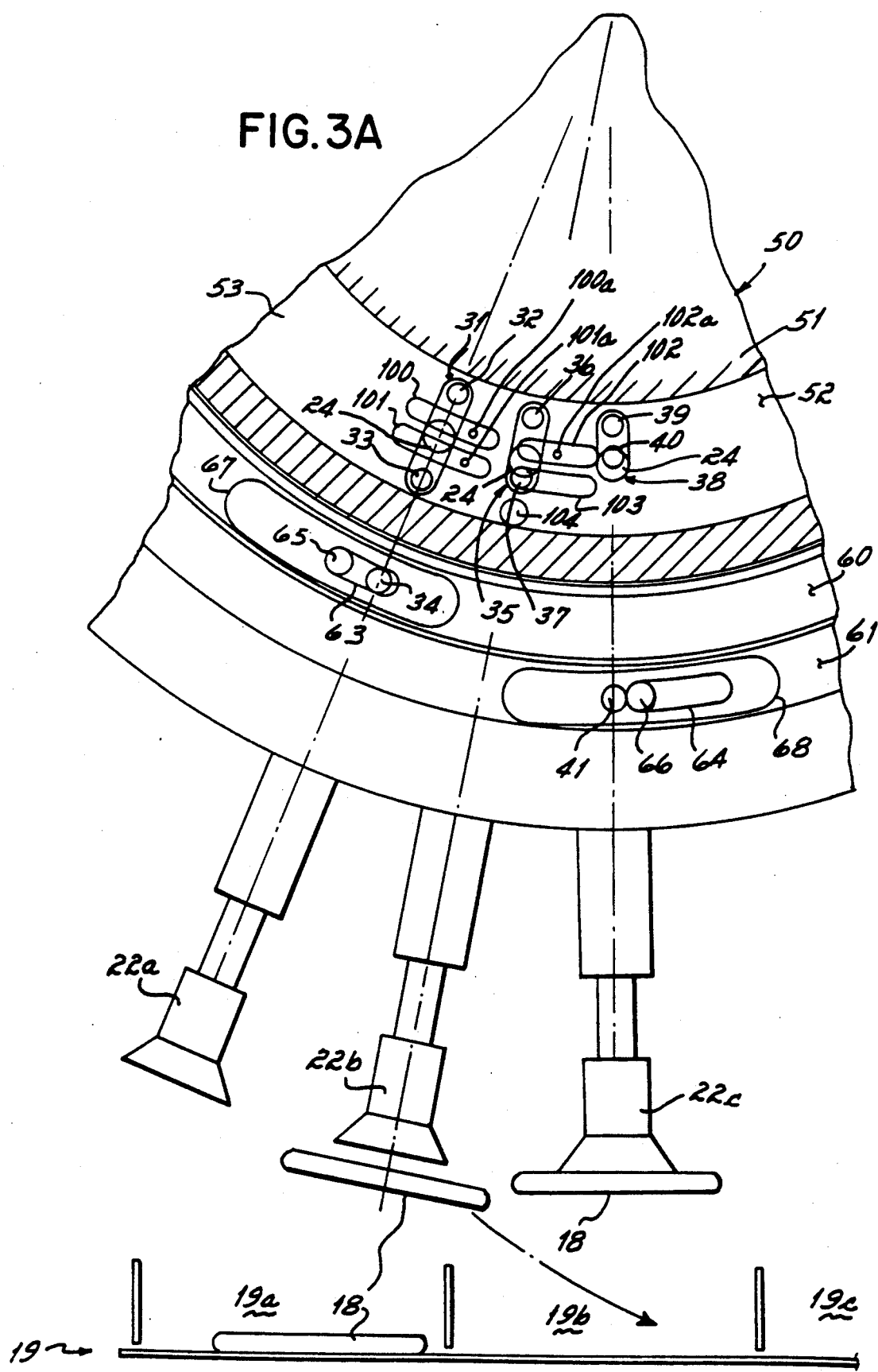
FIG. 3A is a fragmentary diagrammatic view of the pouch transfer apparatus similar to FIG. 3 but with certain elements omitted for clarity in showing the interaction of the ports and slots in the transfer wheel assembly and the vacuum shoe.
Figure 4:
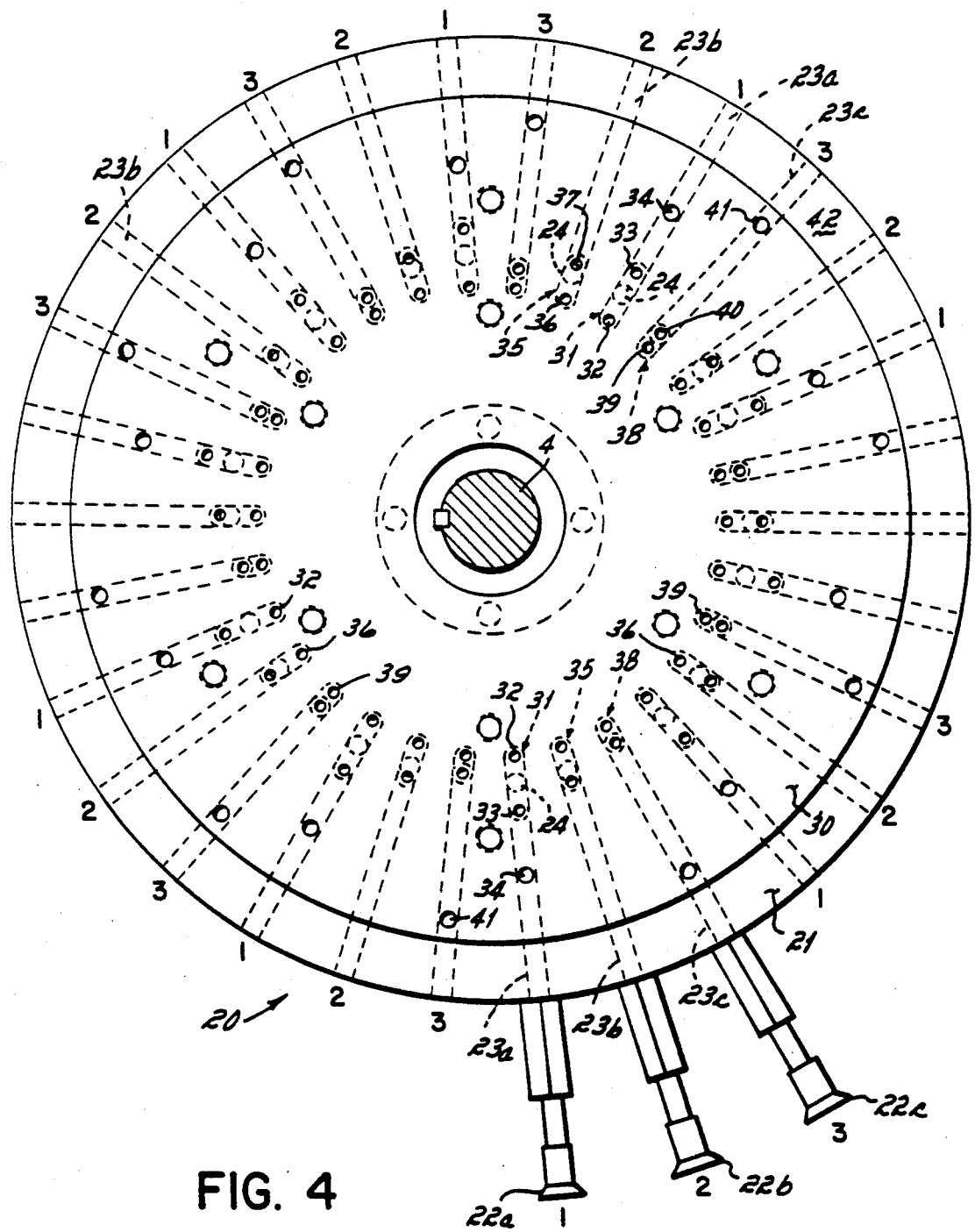
FIG. 4 is a cross-sectional view taken along line 4—4 of FIG. 2 showing the porting pattern in the wear plate.

FIG. 3A diagrammatically shows the interaction of the radial slots 31, 35, 38 in the wear plate 30 with the arcuate slots 100, 101, 102, 103 in the vacuum shoe 53 as the transfer wheel assembly 20 rotates against the vacuum shoe 53. Also shown is the interaction of the near lane blow-off port 34 in the wear plate 30 with the arcuate blow-off slot 63 in the inner drop-off shoe 60. The far lane blow-off port 41 in the wear plate 30 is shown in a position communicating with the arcuate blow-off port 66 in the outer drop-off shoe 61.

As illustrated in FIG. 3A, the near lane suction heads 22a have rotated past the drop-off point for the near lane 19a of the pouch conveyor 19. When the blow-off port 34 in the wear plate 30 reached the port 65 in the inner drop-off shoe 60, a pouch 18 was ejected from the near lane suction heads 22a into the near lane 19a of the conveyor 19. Specifically, the blow-off port 34 received a positive pressure from the port 65 and slot 63 in the inner drop-off shoe 60 and this pressure traveled to the suction heads 22a through the port 34 in the wear plate and the ports 25 and 23a (not shown in FIG. 3A), respectively, in the transfer wheel 21 to eject the pouch 18.

The middle lane suction heads 22b is shown to have just released a pouch 18 at the drop-off point for the middle lane 19b of the pouch conveyor 19. Specifically, the port 37 in the wear plate 30 is in communication with the arcuate blow-off slot 103 (which is receiving positive pressure from a supply line 104) in the vacuum shoe 53 and the pressure is travelling through the ports 24 and 23b (not shown in FIG. 3A), respectively, in the transfer wheel 21 to the suction heads 22b to eject the pouch 18 on a path leading to the middle lane 19b of the conveyor 19.

The far lane suction heads 22c are shown to have rotated to a position just prior to the drop-off position for the far lane 19c of the pouch conveyor 19. When the transfer wheel assembly 20 rotates to a position where the port 41 in the wear plate 30 lines up with the port 66 and slot 64 in the drop-off shoe 61, positive pressure will be supplied from the port 66 and slot 64 in the outer drop-off shoe 61, through the blow-off port 41 in the wear plate 30 and ultimately through the ports 23c and 26 (not shown in FIG. 3A), respectively, to the suction heads 23c to eject the pouch 18 on a path leading to the far lane of the conveyor 19.

Accordingly, it will be appreciated that the pouch transfer apparatus of the present invention allows pouches to be transferred from a pouch form, fill and seal machine to the lanes of a multiple lane pouch conveyor more accurately than was heretofore possible. More specifically, the pouch transfer apparatus of the present invention allows for independent adjustment of the angular disposition of the drop-off points of pouches held to a rotating transfer wheel by suction heads thus allowing the operator to compensate for filled pouches having different weights and densities, or to compensate for variations in pouch delivery speeds.

Moreover, it will be appreciated that the invention can be used or modified for use in a system having two, three, four or more drop-off points and in a system using only one suction head (rather than a pair) at each pouch position around the wheel. It will also be appreciated that the invention could be used on the cutter wheel directly.

While a preferred embodiment of the present invention has been described, those skilled in the art will readily recognize further advantages, adaptations and modifications without departing from the scope of the invention which is intended to be limited only by the claims appended hereto.

We claim:

1. Apparatus for transferring pouches cut from a train of pouches to a pouch conveyor comprising:
    a transfer wheel assembly;
    means for rotating said transfer wheel assembly;
    multiple lane conveyor means disposed beneath said transfer wheel assembly and travelling in a direction perpendicular to the path of said transfer wheel assembly for transporting said pouches;
    individual suction heads circumferentially spaced and extending radially from said transfer wheel assembly, said suction heads being carried in a circular path by said transfer wheel assembly;
    means for applying vacuum pressure to each of the suction heads as the transfer wheel assembly rotates the suction head through a segment of the circular path so that the head grasps a pouch overlying said head;
    means for selectively applying positive pressure to said respective suction heads to propel said pouches off of said respective suction heads at different predetermined angular drop-off points of said transfer wheel assembly as it is disposed above said conveyor means to cause said suction heads to release said pouches onto said conveyor means to form a plurality of rows of pouches on said conveyor means, each row being contained in a different lane of said conveyor; and,
    means for individually adjusting said predetermined angular drop-off points.

2. The apparatus of claim 1 wherein positive pressure is applied at three predetermined, angularly spaced drop-off points corresponding to the drop-off points for near, middle and far lanes of a three-lane pouch conveyor.

3. The apparatus of claim 2 wherein said transfer wheel assembly includes a first series of suction heads for dropping pouches into the near lane of said pouch conveyor, a second series of suction heads for dropping pouches into the middle lane of said pouch conveyor and a third series of suction heads for dropping pouches into the far lane of said pouch conveyor.

4. The apparatus of claim 3 wherein the transfer wheel assembly further comprises:
    a first series of radial ports, each radial port in said first series of radial ports extending inwardly from a suction head in said first series of suction heads;

a second series of radial ports, each radial port in said second series of radial ports extending inwardly from a suction head in said second series of suction heads; and, a third series of radial ports, each radial port in said third series of radial ports extending inwardly from a suction head in said third series of suction heads, whereby both said vacuum pressure and said positive pressure are communicated to said first, second and third series of suction heads through said first, second and third series of radial ports, respectively.

5. The apparatus of claim 4 wherein the transfer wheel assembly further comprises:

a series of first axial ports, whereby a first axial port communicates between every radial port and one side of said transfer wheel assembly;

a series of second axial ports, each of said second axial ports communicating between a radial port in said first series of radial ports and said one side of said transfer wheel assembly; and, a series of third axial ports, each of said third axial ports communicating between a radial port in said third series of radial ports and said one side of said transfer wheel assembly.

6. The apparatus of claim 5 wherein said means for applying vacuum pressure to each suction head further comprises:

a vacuum reservoir mounted on said one side of said transfer wheel assembly and having a vacuum chamber in communication with each of said first axial ports during said segment of said circular path.

7. The apparatus according to claim 6 further comprising:

a vacuum shoe rigidly mounted to said vacuum reservoir, said vacuum shoe having a series of vacuum slots bearing against said one side of said transfer wheel assembly, each of said vacuum slots successively in communication with said vacuum chamber during said segment of said circular path for supplying a vacuum to said suction heads causing said suction heads to grasp and hold said pouches until said first, second and third series of suction heads reach their three respective predetermined drop-off points.

8. The apparatus of claim 7 wherein said vacuum shoe further comprises:

a middle lane blow-off slot facing said one side of said transfer wheel assembly and positioned at the angular drop-off point for the pouches to be dropped in the middle lane of said three-lane pouch conveyor, and, means for supplying a positive pressure between said middle lane blow-off slot and said first axial ports of said second series of radial ports for propelling a pouch into said middle lane.

9. The apparatus of claim 8 wherein said means for individually adjusting said drop-off points further comprises:

an adjustable mounting for said vacuum shoe to enable angular adjustment of the location of said middle lane blow-off slot to change the drop-off point of the pouches to be dropped in the middle lane of said three-lane pouch conveyor.

10. The apparatus of claim 9 wherein said means for individually adjusting said drop-off points further comprises:

inner and outer angularly adjustable drop-off shoes resiliently mounted against said one side of said transfer wheel assembly;

said inner adjustable drop-off shoe having a near lane blow-off slot facing said one side of said transfer wheel assembly and positioned at the angular drop-off point for the pouches to be dropped in the near lane of said three-lane pouch conveyor, said near lane blow-off slot being at the same radial position as said series of second axial ports leading to said first series of radial ports;

said outer adjustable drop-off shoe having a far lane blow-off slot facing said one side of said transfer wheel assembly and positioned at the angular drop-off point for the pouches to be dropped in the far lane of said three-lane pouch conveyor, said far lane blow-off slot being at the same radial position as said series of third axial ports leading to said third series of radial ports; and, means for supplying a positive pressure between said near and far lane blow-off slots.

11. The apparatus of claim 10 wherein said transfer wheel assembly further comprises:

a transfer wheel; and, a wear plate rigidly secured to said transfer wheel on said one side of said transfer wheel assembly, said wear plate being positioned between said transfer wheel and said vacuum shoe and having a series of slots and ports for allowing communication of vacuum pressure and positive pressure between said vacuum shoe and said series of first axial ports and for allowing communication of positive pressure between said vacuum shoe and said series of second and third axial ports.

12. Apparatus for orienting pouches comprising:

a transfer wheel having a plurality of suction heads spaced around its periphery;

means for rotating said transfer wheel;

means for applying vacuum to said suction heads to grasp individual pouches;

means for selectively interrupting said vacuum at different predetermined angular drop-off points of said wheel to cause respective suction heads to release said pouches onto said conveyor to form a plurality of rows of pouches on said conveyor; and, means for individually adjusting said predetermined angular drop-off points.

13. Apparatus for packing pouches comprising:

a transfer wheel having a plurality of suction heads spaced around its periphery;

means for rotating said transfer wheel;

a conveyor passing below and at right angles to the rotary path of said transfer wheel;

means for applying vacuum to said suction heads to grasp individual pouches;

means for selectively interrupting said vacuum at different predetermined angular drop-off points of the rotary path of said transfer wheel to cause said suction heads to release said pouches onto said conveyor to form a plurality of rows of pouches on said conveyor; and, means for individually adjusting said predetermined angular drop-off points.

14. Apparatus for converting a chain of connected pouches into at least two spaced lanes of individual pouches on a pouch conveying means comprising:

means for cutting individual pouches from said chain of pouches;

rotary transfer wheel means having circumferentially disposed suction heads for picking up pouches cut from said chain of pouches;

multiple lane pouch conveying means;

means for selectively supplying vacuum to said suction heads;

vacuum interrupting means for selectively interrupting said vacuum to selected suction heads to drop pouches at predetermined drop-off points to form at least two spaced lanes of separated pouches on said conveying means; and, means for adjusting said vacuum interrupting means to independently adjust the position of said drop-off points with respect to each other.

15. A method of transferring individual pouches cut from a train of pouches passing from a pouch form, fill and seal machine to at least two different lanes of a multiple lane pouch conveyor, the method comprising the steps of:

(a) rotating a transfer wheel having a plurality of circumferentially spaced and radially extending suction heads over an upstream end of said pouch conveyor;

(b) supplying vacuum pressure to said suction heads during a segment of rotation of said transfer wheel and holding cut-off pouches therein;

(c) carrying individual pouches on said suction heads to predetermined drop-off points;

(d) independently adjusting said pouch drop-off points with respect to each other for dropping pouches into each conveyor lane.

16. The method of claim 15 further comprising the step of:

(e) selectively supplying a positive pressure to said suction heads at said drop-off points to propel pouches onto said conveyor lanes.

17. A method of transferring pouches comprising the steps of:

(a) carrying pouches on a rotating transfer wheel to a plurality of different pouch drop-off points; and, (b) independently adjusting said pouch drop-off points with respect to each other for dropping respective pouches into different predetermined locations.

18. The method of wherein the transfer wheel includes a plurality of radially extending, circumferentially spaced suction heads and step (a) of the method further comprises the steps of:

i. selectively supplying a vacuum pressure to said suction heads; and, ii. grasping pouches with said suction heads to carry said pouches from said pouch transfer point to said plurality of drop-off points.

19. The method of claim 18 further comprising the step of:

iii. supplying positive pressure to said suction heads at said plurality of drop-off points to propel said pouches into said different predetermined locations.

20. A method of transferring separated pouches, moving seriatim in a single path, into at least two spaced lanes of individual pouches, including the steps of:

(a) picking up separated pouches from said single path with a rotationally mounted suction head;

(b) transferring pouches in a circular path to an arcuate drop-off segment;

(c) selectively dropping pouches from said heads and from two spaced drop-off points along said segment into at least two spaced lanes of pouches; and, (d) independently adjusting the disposition of said drop-off points with respect to each other.

* * * * *